Patented Sept. 11, 1951

2,567,853

UNITED STATES PATENT OFFICE 2,567,853

PROCESS OF VULCANIZING RUBBER AND PRODUCT THEREOF

William McGillivray Morgan, Oswestry, England, assignor to Monsanto Chemical Company, St. Louis, Mo., a corporation of Delaware No Drawing. Application December 16, 1949, Serial No. 133,485. In Great Britain December 21, 1948

14 Claims. (Cl. 260—782)

This invention relates to the processing of rubber, and to new vulcanization retarders.

The use of a vulcanization retarder in the compounding of rubber is common practice in order to reduce the tendency to "scorch," which can be defined as partial and premature vulcanization of the rubber stock taking place during the mixing operation in the course of which the filler, as for example carbon black, and vulcanization accelerator, among other substances, are introduced, or during the shaping operation, extrusion or calendering for example. The use of vulcanization retarders may, moreover, become of increasing importance with the greater use of the so-called "furnace carbon blacks." In the process of mixing rubber carbon blacks made by the channel process (the so-called channel carbon blacks) are in wide use, especially in the tire industry, and carbon blacks made by the furnace process (known as furnace carbon blacks) are also in considerable use. However, there is a possibility that furnace carbon blacks may become more widely used than they are at present, and it has been found that when using furnace blacks there is a greater tendency for scorching to take place during compounding. This tendency appears to increase with the fineness of the furnace black.

I have now discovered a new series of vulcanization retarders, particularly useful in rubber stocks containing furnace carbon blacks, but also useful in other instances whether carbon blacks are present or not.

According to the invention there is employed as vulcanization retarder an organic hydrogen sulphate or a salt of such a compound with a metal other than an alkali metal, formed of course by replacement of the available hydrogen in the hydrogen sulphate group.

Preferably the organic hydrogen sulphate is an aliphatic hydrogen sulphate, especially a long-chain aliphatic compound, and it is desirable that the aliphatic group should contain a carbon chain of not less than eight carbon atoms. The lauryl and oleyl groups are eminently suitable. Another hydrogen sulphate which has been found particularly valuable (especially when used in the form of its zinc salt) is one which can be obtained by sulphating a commercial aliphatic secondary alcohol of the formula

R.CH(OH).CH₃ where R is an aliphatic chain having an average length of ten carbon atoms.

The zinc salts have been found to be especially effective, and other particularly suitable examples are the aluminum and calcium salts.

The invention is illustrated by the following examples relating to the treatment of natural rubber, to which the invention primarily relates. It will be appreciated, however, that it is also useful in vulcanizing synthetic rubbers of the type which can be vulcanized with sulphur.

Example 1

Zinc lauryl sulphate in a quantity of 2 parts by weight was added during the mixing of the following stock, using a very fine particle size furnace carbon black:

| | Parts by weight |
|---|---|
| Smoked sheets rubber | 100 |
| Carbon black | 45 |
| Zinc oxide | 5 |
| Stearic acid | 3 |
| Rosin-paraffin oil softener | 3 |
| Sulphur | 2.5 |
| Mercaptobenzothiazole | 0.6 |

Portions of this stock and of one identical except that it was compounded without the addition of the zinc lauryl sulphate were tested for scorching properties using a Mooney plastometer (with a large rotor) at 120° C., one minute's preheating of the stock being given in the apparatus prior to starting the motor. In this way the "Mooney plasticity value" was obtained for each stock after different periods of heating, and hence the decrease in the plasticity of the stock with increased time of heating could be determined. A decrease in the plasticity is indicated by an increase in the Mooney plasticity value.

The following results were obtained:

| Period of heating at 120° C., in minutes | Mooney Plasticity Value | |
|---|---|---|
| | Base Stock | Base stock plus the zinc salt |
| 1 | 28 | 18.5 |
| 3 | 25.5 | 17.0 |
| 5 | 23.5 | 16.0 |
| 7 | 24.0 | 16.0 |
| 9 | 24.0 | 16.0 |
| 11 | 26.0 | 17.0 |
| 12 | 28.0 | |
| 13 | 30.5 | 18.0 |
| 14 | 35.0 | 19.0 |
| 15 | 40.5 | 20.0 |
| 16 | 48.5 | 22.5 |
| 17 | 60.0 | 26.5 |
| 18 | | 30.0 |
| 19 | | 36.0 |
| 20 | | 43.5 |
| 21 | | 53.5 |
| 22 | | 68.5 |

The curves that can be drawn for the two stocks by plotting the Mooney plasticity value against the time of heating at 120° C. can be compared directly over the range of the results, the rate of rise of the plasticity value indicating the measure of scorching, or precure. For convenience, as a guide in comparing results, the "scorch time" might be taken as the time required for the Mooney plasticity value to rise to 5.0 units above the minimum value given in the test by the stock, both points being determined from the graph.

In the above instance, the "scorch time" for the base stock measured in this way was 12½ minutes, and that for the stock containing the zinc salt was 15½ minutes.

The zinc lauryl sulphate used in this example was prepared by sulphating lauryl alcohol to give lauryl hydrogen sulphate and reacting this with zinc chloride to form the zinc salt, and the salts used in the further examples given below were obtained in an analogous manner.

*Example 2*

Example 1 was repeated using 0.8 part by weight of zinc oleyl sulphate instead of the 2 parts of zinc lauryl sulphate.

The "scorch time" of the base stock was found to be 12½ minutes, and that of the stock containing the zinc salt was found to be 15 minutes.

*Example 3*

Example 1 was repeated using 2 parts by weight of aluminum oleyl sulphate instead of the 2 parts of zinc lauryl sulphate.

The "scorch time" of the base stock was found to be 11 minutes, and that of the stock containing the aluminum salt was found to be 16½ minutes. It is to be observed that the difference between the figures obtained with the base stock in this present example and in Example 1 is due to the fact that the two stocks were prepared on different occasions. Divergences of this kind are common in rubber technology, but the respective figures for the base stock provide proper comparison in each example.

*Example 4*

Example 1 was repeated using 2 parts by weight of calcium oleyl sulphate instead of the 2 parts of zinc lauryl sulphate.

The "scorch time" of the base stock was found to be 13½ minutes, and that of the stock containing the calcium salt was found to be 16 minutes.

*Example 5*

Example 1 was repeated using, instead of the 2 parts by weight of zinc lauryl sulphate, a similar weight of the zinc salt of the hydrogen sulphate of a commercial aliphatic secondary alcohol of the formula

R.CH(OH).CH₃ where R was an aliphatic chain having an average length of ten carbon atoms.

The "scorch time" of the base stock was found to be 12½ minutes, and that of the stock containing the zinc salt was found to be 21 minutes.

What is claimed is:

1. A process of vulcanizing a rubber which comprises heating the rubber containing sulfur and an organic accelerator in the presence of a small amount of a vulcanization retarder selected from the group consisting of aliphatic hydrogen sulfates containing at least eight but not more than eighteen carbon atoms and zinc, calcium and aluminum salts thereof.

2. A process of vulcanizing a furnace black rubber stock which comprises heating the rubber containing a furnace black, sulfur and a thiazole accelerator in the presence of a small amount of a vulcanization retarder selected from the group consisting of aliphatic hydrogen sulfates containing at least eight but not more than eighteen carbon atoms and zinc, calcium and aluminum salts thereof.

3. A process of vulcanizing a rubber which comprises heating the rubber containing sulfur and an organic accelerator in the presence of a small amount of a vulcanization retarder consisting essentially in a zinc salt of an aliphatic hydrogen sulfate containing at least eight but not more than eighteen carbon atoms.

4. A process of vulcanizing a rubber which comprises heating the rubber containing sulfur and an organic accelerator in the presence of a small amount of a vulcanization retarder consisting essentially in the hydrogen sulfate of an alcohol of the structure R.CH(OH).CH₃ where R is an aliphatic chain having ten carbon atoms.

5. A process of vulcanizing a rubber which comprises heating the rubber containing sulfur and an organic accelerator in the presence of a small amount of a vulcanization retarder consisting essentially in a zinc salt of the hydrogen sulfate of an alcohol of the structure R.CH(OH).CH₃ where R is an aliphatic chain having ten carbon atoms.

6. A process of vulcanizing a rubber which comprises heating the rubber containing sulfur and an organic accelerator in the presence of a small amount of a vulcanization retarder consisting essentially in a zinc salt of the hydrogen sulfate of oleyl alcohol.

7. A process of vulcanizing a rubber which comprises heating the rubber containing sulfur and an organic accelerator in the presence of a small amount of a vulcanization retarder consisting essentially in a zinc salt of the hydrogen sulfate of lauryl alcohol.

8. Rubber which has been vulcanized by the process of claim 1.

9. Rubber which has been vulcanized by the process of claim 2.

10. Rubber which has been vulcanized by the process of claim 3.

11. Rubber which has been vulcanized by the process of claim 4.

12. Rubber which has been vulcanized by the process of claim 5.

13. Rubber which has been vulcanized by the process of claim 6.

14. Rubber which has been vulcanized by the process of claim 7.

WILLIAM McGILLIVRAY MORGAN.

REFERENCES CITED

The following references are of record in the file of this patent:

UNITED STATES PATENTS

| Number | Name | Date |
|---|---|---|
| 1,844,943 | Cadwell | Feb. 16, 1932 |
| 1,871,037 | Cadwell | Aug. 9, 1932 |
| 2,046,015 | Bunbury et al. | June 30, 1936 |
| 2,058,840 | Thies | Oct. 27, 1936 |
| 2,100,370 | Williams | Nov. 30, 1937 |